(12) United States Patent
Scinta et al.

(10) Patent No.: US 9,702,237 B2
(45) Date of Patent: Jul. 11, 2017

(54) HYBRID STEAM GENERATION WITH CARBON DIOXIDE RECYCLE

(71) Applicant: CONOCOPHILLIPS COMPANY, Houston, TX (US)

(72) Inventors: James Scinta, Sun City Center, FL (US); James Seaba, Calgary (CA); Scott Macadam, Calgary (CA)

(73) Assignee: ConocoPhillips Company, Houston, TX (US)

( * ) Notice: Subject to any disclaimer, the term of this patent is extended or adjusted under 35 U.S.C. 154(b) by 570 days.

(21) Appl. No.: 14/183,000

(22) Filed: Feb. 18, 2014

(65) Prior Publication Data

US 2014/0231081 A1    Aug. 21, 2014

Related U.S. Application Data

(60) Provisional application No. 61/767,108, filed on Feb. 20, 2013.

(51) Int. Cl.
*E21B 43/24*    (2006.01)
*E21B 43/16*    (2006.01)

(52) U.S. Cl.
CPC ........ *E21B 43/2406* (2013.01); *E21B 43/164* (2013.01); *E21B 43/2408* (2013.01); *Y02P 90/70* (2015.11)

(58) Field of Classification Search
CPC .................................................. E21B 43/2406
See application file for complete search history.

(56) References Cited

U.S. PATENT DOCUMENTS

| | | |
|---|---|---|
| 4,725,380 A | 2/1988 | Pinto |
| 5,583,825 A | 12/1996 | Carrazzone et al. |
| 6,205,289 B1 | 3/2001 | Kobro |
| 6,536,523 B1 | 3/2003 | Kresnyak et al. |
| 6,725,920 B2 | 4/2004 | Zhang et al. |
| 6,988,549 B1 | 1/2006 | Babcock |
| 7,066,254 B2 | 6/2006 | Vinegar et al. |
| 7,591,306 B2 | 9/2009 | Hocking |
| 8,371,380 B2 | 2/2013 | Embry et al. |
| 2007/0209367 A1 | 9/2007 | Bell et al. |

(Continued)

OTHER PUBLICATIONS

International Search Report, PCT/US14/16927; Dated May 15, 2014.
U.S. Appl. No. 14/302,004; Steam Generator and Carbon Dioxide Capture, filed Jun. 11, 2014; Inventor—David W. Larkin.

*Primary Examiner* — Robert E Fuller
(74) *Attorney, Agent, or Firm* — ConocoPhillips Company

(57) ABSTRACT

Systems and methods relate to recovering hydrocarbons by injecting into a reservoir outputs from two different types of steam generators along with carbon dioxide, enabling lower fuel consumption for such a hybrid-based approach versus either type of steam generator alone. One steam generator vaporizes water by thermal transfer from combustion with exhaust from the combustion remaining separated from the steam. Since this type of steam generator outputs a limited carbon dioxide concentration with the steam, at least part of the carbon dioxide injected comes from recycling the carbon dioxide separated out of production fluids recovered from the reservoir. Another steam generator produces the steam by direct water contact with combustion products to produce a resulting fluid including the steam and additional carbon dioxide.

20 Claims, 1 Drawing Sheet

(56) References Cited

U.S. PATENT DOCUMENTS

| | | | |
|---|---|---|---|
| 2008/0289822 A1* | 11/2008 | Betzer Tsilevich | E21B 43/24 166/272.3 |
| 2010/0078167 A1 | 4/2010 | Bunger et al. | |
| 2010/0147516 A1* | 6/2010 | Betzer-Zilevitch | B03D 1/02 166/272.6 |
| 2010/0230097 A1* | 9/2010 | Seaba | E21B 43/164 166/272.3 |
| 2011/0303413 A1 | 12/2011 | Fairbanks et al. | |
| 2013/0000897 A1 | 1/2013 | Fang et al. | |

* cited by examiner

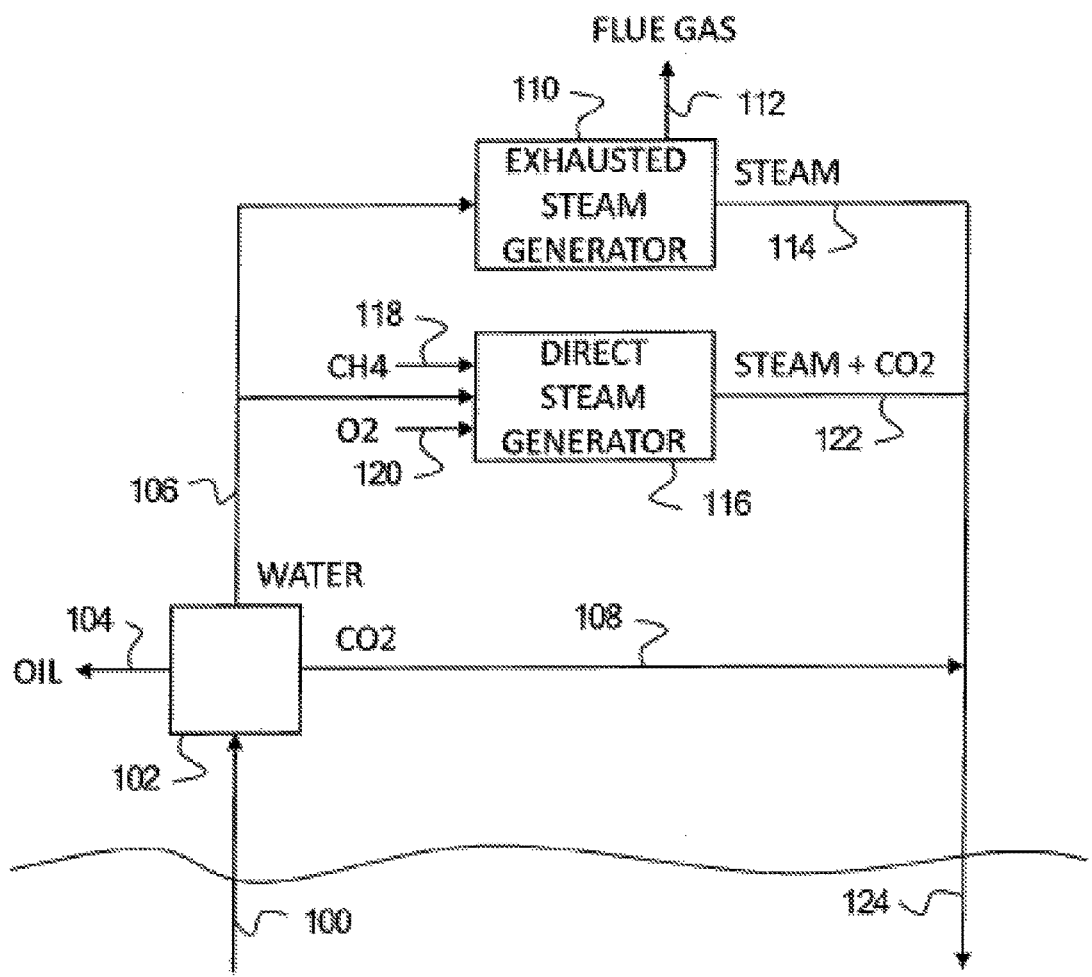

HYBRID STEAM GENERATION WITH CARBON DIOXIDE RECYCLE

CROSS-REFERENCE TO RELATED APPLICATIONS

This application is a non-provisional application which claims benefit under 35 USC §119(e) to U.S. Provisional Application Ser. No. 61/767,108 filed 20 Feb. 2013, entitled "HYBRID STEAM GENERATION WITH CARBON DIOXIDE RECYCLE," which is incorporated herein in its entirety.

STATEMENT REGARDING FEDERALLY SPONSORED RESEARCH OR DEVELOPMENT

None

FIELD OF THE INVENTION

Embodiments of the invention relate to methods and systems of producing a fluid of steam and carbon dioxide for injection into a reservoir to facilitate oil recovery.

BACKGROUND OF THE INVENTION

Enhanced oil recovery processes employ thermal methods to improve recovery of heavy oils from subsurface reservoirs. For example, injection of steam into heavy oil bearing formations heats the oil in the reservoir, which reduces the viscosity of the oil and allows the oil to flow to a collection well. A mixture of the oil and produced water that flows to the collection well is recovered to the surface where the oil is separated from the water.

Different approaches exist for generating the steam. Prior once through steam generators (OTSGs) produce a wet steam by a single pass of water through a boiler isolated from fluid communication with combustion used to heat the boiler. An alternative approach utilizes a direct steam generator (DSG) to produce steam by contacting water with products from oxy-fuel combustion.

Effluent from the DSG thus includes carbon dioxide along with the steam from water vaporization and the combustion to limit water replenishing requirements. The carbon dioxide may enhance hydrocarbon recovery and provide another advantage over the OTSG. However, the DSG can only provide a narrow range of carbon dioxide concentrations and other ranges may be more effective.

Therefore, a need exists for systems and methods to generate steam with the desired concentrations of carbon dioxide and that are more cost efficient.

SUMMARY OF THE INVENTION

In one embodiment, a method of recovering hydrocarbons with steam includes generating the steam in both a first device in which combustion heats water for vaporization and exhaust from the combustion remains separated from the steam and a second device in which water vaporizes by direct contact with combustion products to produce a resulting fluid including the steam and carbon dioxide. Injecting the steam from the first device and the fluid from the second device into a formation facilitates recovery of a mixture including the hydrocarbons, condensate of the steam and the carbon dioxide. The method further includes processing the mixture to separate out the carbon dioxide that is recycled by injection with the steam from the first device.

For one embodiment, a system for recovering hydrocarbons with steam includes a first steam generator in which combustion heats water for vaporization and exhaust from the combustion remains separated from the steam and a second steam generator in which water vaporizes by direct contact with combustion products to produce a resulting fluid including the steam and carbon dioxide. The system further includes at least one injection well coupled to the first and second steam generators for introducing the steam and the carbon dioxide from the first and second steam generators into a formation and at least one production well to recovery from the formation a mixture including the hydrocarbons, condensate of the steam and the carbon dioxide. A processing unit of the system separates the carbon dioxide out of the mixture and is coupled to convey the carbon dioxide that is recovered back to the at least one injection well for introducing into the formation with the steam from the first steam generator.

BRIEF DESCRIPTION OF THE DRAWINGS

A more complete understanding of the present invention and benefits thereof may be acquired by referring to the following description taken in conjunction with the accompanying drawing.

The drawing depicts a schematic of a hydrocarbon recovery system including a direct steam generator and an exhausted steam generator with outputs coupled to a reservoir for injection with recycled carbon dioxide separated from production fluids recovered from the reservoir, according to one embodiment of the invention.

DETAILED DESCRIPTION OF THE INVENTION

Embodiments of the invention relate to systems and methods of recovering hydrocarbons by injecting into a reservoir outputs from two different types of steam generators along with carbon dioxide. Synergistic results enable lower fuel consumption for such a hybrid based approach relative to using either type of steam generator alone. One steam generator vaporizes water by thermal transfer from combustion with exhaust from the combustion remaining separated from the steam. Since this type of steam generator outputs a limited carbon dioxide concentration with the steam, at least part of the carbon dioxide injected comes from recycling the carbon dioxide separated out of production fluids recovered from the reservoir. Another steam generator produces the steam by direct water contact with combustion products to produce a resulting fluid including the steam and additional carbon dioxide.

FIG. 1 illustrates a system for recovering hydrocarbons that includes a processing unit 102, an exhausted steam generator 110 and a direct steam generator or DSG 116 that are all coupled to at least one production well 100 and at least one injection well 124. In an exemplary embodiment, the injection well 124 and the production well 100 provide a well pair for a steam assisted gravity drainage (SAGD) operation. Various other recovery operations including cyclic steam stimulation, solvent aided SAGD and steam drive may also employ processes described herein.

In operation, the processing unit 102 receives a mixture that is recovered from the production well 100 and includes hydrocarbons or oil, condensate from steam that is injected to heat and mobilize the oil, some carbon dioxide injected with the steam, produced gases, and solids. The processing unit 102 may include liquid-gas separators, water-oil separators, liquid-solid separators and treatment equipment for gas and water. The processing unit 102 separates the mixture into a sales stream 104 of the oil, a steam generator feed stream 106 of water and a gas recycle stream 108 of the carbon dioxide.

Recovery of the carbon dioxide from produced fluids at the processing unit 102 costs less than attempting to recover the carbon dioxide in flue streams. Capturing dilute carbon dioxide within flue streams that are predominantly nitrogen requires expensive recovery procedures. Embodiments thus provide efficient carbon dioxide emission reduction options as exemplified further herein.

The exhausted steam generator 110 burns fuel in air to heat and vaporize the water input via the feed stream 106. Exhaust gases from combustion of the fuel and air exits a flue 112 of the exhausted steam generator 110 separate from a steam output 114 that conveys resulting vaporized water to the injection well 124. A boiler or once through steam generator (OTSG) may provide the exhausted steam generator 110.

In contrast to the exhausted steam generator 110, the direct steam generator 116 burns fuel, such as natural gas or methane from fuel inlet 118, in oxygen within a combustor where the water from the feed stream 106 is also introduced. An air separation unit (ASU) output 120 may supply the oxygen to the direct steam generator 116. A fluid output 122 from the direct steam generator 116 thus conveys carbon dioxide as a product of combustion along with steam from both water vaporization and the combustion to the injection well 124.

The gas recycle stream 108 also conveys the carbon dioxide that is recovered in the processing unit 102 back to the injection well 124 for introducing into the formation with at least the steam output 114 from the exhausted steam generator 110. In some embodiments, only some of the carbon dioxide recovered in the processing unit 102 mixes with the steam for injection to provide a desired carbon dioxide concentration for injection and an excess portion of the carbon dioxide is sent offsite for capture or sequestration. Carbon dioxide recycle rate via the recycle stream 108 and production rate split between the steam generators 110, 116 depends on retention rate of the carbon dioxide in the reservoir and desired carbon dioxide injection rate for a particular operation.

Increases in the retention rate of the carbon dioxide in the reservoir reduce the amount of the carbon dioxide produced and available for recycle, thereby requiring an increase in the production rate of the direct steam generator 116 relative to the exhausted steam generator 110 for a given desired carbon dioxide injection concentration. Similarly, increasing the desired carbon dioxide injection concentration also raises the production rate of the direct steam generator 116 relative to the exhausted steam generator 110 and/or amount of the recycle stream 108 utilized for injection of the carbon dioxide. In some embodiments, level of the carbon dioxide may range between 1% and 25%, greater than 15% or less than 10% of the steam by mass.

Mixing of the steam output 114, the fluid output 122 of the direct steam generator 116 and the recycle stream 108 enables this concentration range of carbon dioxide being injected given that, for example, the fluid output 122 of the direct steam generator 116 may only provide carbon dioxide levels between 10% and 14% of the steam by mass that cannot otherwise be altered. Such control of the carbon dioxide concentration in the steam being injected provides flexibility. For example, a production profile may call for a lower carbon dioxide injection concentration in early production stages and more in later stages, which may be accomplished by increasing over time the amount of the carbon dioxide sent to the injection well 124 via the recycle stream 108.

In some embodiments; the direct steam generator 116 superheats the steam exiting through the fluid output 122. This superheating prevents condensation prior to introduction into the injection well 124. The condensation may otherwise occur since the steam from the exhausted steam generator 110 may cool as conveyed from a central processing facility to a wellpad or as a result of the carbon dioxide in the recycle stream 108 being introduced at a relatively cool temperature.

Locating the direct steam generator 116 at the wellpad and offsite from the exhausted steam generator 110 that may be at the central processing facility ensures that any such condensate is vaporized. The condensate may constitute at least five percent of the steam flowrate from the exhausted steam generator 110, represents thermal loss and would otherwise be returned for vaporization adding to system burdens. Compared with conveying steam, relative ease in transporting oxygen, fuel and water facilitates location of the direct steam generator 116 away (e.g., at least 10 kilometers) from the central processing facility and proximate (e.g., within 10, 5 or 1 kilometers) from a wellpad where the injection well 124 is located.

In some embodiments, the fluid output 122 from the direct steam generator 116 supplies more remote wellpads relative to the central processing facility than those supplied by the exhausted steam generator 110. The steam output 114 thus mixes with the carbon dioxide from the recycle stream 108 but may not mix with the fluid output 122 of the direct steam generator 116. All injection into the reservoir however may still contain the carbon dioxide with the steam as desired.

As shown in the following table, process modeling compared results associated with two comparative cases and two exemplary cases all for a 90,000 barrel per day SAGD facility having all electrical power generated by a natural gas-fired combined cycle (NGCC) plant. These four cases include generating all required steam with an OTSG, generating all required steam with a DSG, and DSG-OTSG hybrid applications (e.g., as shown in FIG. 1) with either 40 or 20 percent carbon dioxide retention in the reservoir. Reservoir modeling shows that while such fractions of the injected carbon dioxide may be retained in the reservoir significant remaining amounts may return to the surface in the produced gas making recycling possible.

For this analysis, an ideal carbon dioxide injection rate selected corresponds to the DSG that has carbon dioxide at 11.4% of the steam by mass. This carbon dioxide concentration results in lowering the steam to oil ratio (SOR) from 2.5 to 2.125. Such reduction in the SOR derives from benefits associated with injecting the carbon dioxide with the steam, which benefits may include viscosity reduction of the hydrocarbons from dissolution with the carbon dioxide, insulating effects of the carbon dioxide or carbon dioxide pressure support.

|  | OTSG | DSG | DSG-OTSG Hybrid | |
|---|---|---|---|---|
|  |  |  | 40% $CO_2$ Retention | 20% $CO_2$ Retention |
| SOR | 2.5 | 2.125 | 2.125 | 2.125 |
| Steam (tons per hour) | | | | |
| OTSG | 1566 | 0 | 824 | 1082 |
| DSG | 0 | 1264 | 482 | 234 |
| Total | 1488 | 1264 | 1264 | 1264 |
| $CO_2$ Flowrates (tons per hour) | | | | |
| DSG | 0 | 144 | 58 | 29 |
| Recycle | 0 | 0 | 87 | 115 |
| Total | 0 | 144 | 144 | 144 |
| Electrical Loads (megawatts) | | | | |
| Facility base | 92 | 92 | 92 | 92 |
| ASU | 0 | 94 | 38 | 19 |
| Evaporator | 0 | 18 | 6 | 3 |
| $CO_2$ compress | 0 | 12 | 7 | 10 |
| Total | 92 | 217 | 143 | 123 |
| Fuel Flowrates (tons per hour) | | | | |
| OTSG | 78 | 0 | 41 | 54 |
| DSG | 0 | 54 | 21 | 11 |
| NGCC | 15 | 36 | 24 | 20 |
| Total | 93 | 90 | 86 | 85 |
| Relative usage | 1 | .96 | .92 | .91 |
| Green House Gas Footprint (tons per hour) | | | | |
| $CO_2$ emissions | 251 | 103 | 176 | 200 |

The DSG in the hybrid applications produces about 38 and 19 percent of the total steam generated for respective 40 and 20 percent carbon dioxide retention cases. Relative fuel usage shown in the table compares total fuel used by being normalized to the OTSG case. The relative fuel use in the hybrid cases range between 0.91-0.92, which represents reduction in fuel operating expense relative to not only the OTSG case but also the DSG case that is 0.96.

While capital expense is not quantified in results shown in the table, the hybrid application provides lower capital costs than the DSG case due to ability to use smaller air separation units given that not all steam is generated by the DSG. The hybrid application also still enables capturing some of the carbon dioxide produced with extent of the capture depending on steam production rate split between the OTSG and the DSG. Carbon dioxide emissions thus drop 20-30% in the hybrid application relative to the OTSG case.

The preferred embodiments of the invention have been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method of recovering hydrocarbons with steam, comprising:
    generating steam in a first device in which combustion heats water for vaporization and exhaust from the combustion remains separated from the steam produced;
    generating steam in a second device in which water vaporizes by direct contact with combustion products to produce a resulting fluid including the steam and carbon dioxide;
    injecting the steam from the first device and the fluid from the second device into a formation to facilitate recovery of a mixture including the hydrocarbons, condensate of the steam and the carbon dioxide; and
    processing the mixture to separate out the carbon dioxide from said mixture; and
    recycling said separated carbon dioxide by injection into said formation.

2. The method of claim 1, wherein the steam from the first device is combined with the fluid from the second device and said separated carbon dioxide is recycled to provide a combined stream with total carbon dioxide less than 10 percent of the steam by mass for the injecting.

3. The method of claim 1, wherein the steam from the first device is combined with the fluid from the second device and said separated carbon dioxide is recycled to provide a combined stream with total carbon dioxide greater than 15 percent of the steam by mass for the injecting.

4. The method of claim 1, further comprising altering over time a total concentration of carbon dioxide in a combined stream injected into the formation and formed of the steam from the first device, the fluid from the second device and the separated carbon dioxide that is recycled.

5. The method of claim 1, further comprising increasing over time a total concentration of carbon dioxide in a combined stream injected into the formation and formed of the steam from the first device, the fluid from the second device and the separated carbon dioxide that is recycled.

6. The method of claim 1, wherein the steam from the second device is superheated to vaporize condensation of the steam from the first device prior to the injecting.

7. The method of claim 1, wherein said separated carbon dioxide that is recycled is injected into the formation with the steam from the first device separately from injection into the formation of the fluid from the second device.

8. The method of claim 1, wherein the first and second devices are separated from one another by at least 10 kilometers.

9. The method of claim 1, wherein the first device is disposed at least 10 kilometers from a well for the injecting and the second device is disposed within 5 kilometers of the well.

10. The method of claim 1, wherein the first device is a once through steam generator.

11. The method of claim 1, wherein the injecting is into a well disposed in the formation for a steam assisted gravity drainage operation.

12. A system for recovering hydrocarbons with steam, comprising:
    a first steam generator in which combustion heats water for vaporization to steam and exhaust from the combustion remains separated from the steam produced;
    a second steam generator in which water vaporizes by direct contact with combustion products to produce a resulting fluid including the steam and carbon dioxide;
    at least one injection well coupled to the first and second steam generators for introducing the steam and the carbon dioxide from the first and second steam generators into a formation;
    at least one production well to recover from the formation a mixture including the hydrocarbons, condensate of the steam and the carbon dioxide; and a processing unit to separate the carbon dioxide out of the mixture and coupled to convey the separated carbon dioxide back to the at least one injection well for introducing into the formation with the steam from the first steam generator.

13. The system of claim 12, wherein the steam generators have outputs coupled to mix with the separated carbon dioxide to form a combined stream conveyed to the injection well and with a total carbon dioxide less than 10 percent of the steam by mass.

14. The system of claim 12, wherein the steam generators have outputs coupled to mix with the separated carbon dioxide to form a combined stream conveyed to the injection well and with a total carbon dioxide greater than 15 percent of the steam by mass.

15. The system of claim 12, wherein the second steam generator produces a superheated steam to vaporize condensation of the steam from the first steam generator.

16. The system of claim 12, wherein the steam generators are coupled to different wells of the at least one injection well for introducing the fluid from the second steam generator into the formation separately from the steam from the first steam generator.

17. The system of claim 12, wherein the first and second steam generators are separated from one another by at least 10 kilometers.

18. The system of claim 12, wherein the first steam generator is disposed at least 10 kilometers from the injection well and the second steam generator is disposed within 5 kilometers of the injection well.

19. The system of claim 12, wherein the first steam generator is a once through steam generator.

20. The system of claim 12, wherein the injection well and the production well form a steam assisted gravity drainage well pair.

\* \* \* \* \*